United States Patent
Ghannam et al.

(10) Patent No.: US 10,696,537 B2
(45) Date of Patent: Jun. 30, 2020

(54) FUEL CAPLESS UNIT HAVING VARIABLE SPRING STIFFNESS

(71) Applicant: Ford Global Technologies, LLC, Dearborn, MI (US)

(72) Inventors: Mahmoud Yousef Ghannam, Canton, MI (US); Swadad Carremm, Canton, MI (US); Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 39 days.

(21) Appl. No.: 15/979,994

(22) Filed: May 15, 2018

(65) Prior Publication Data
US 2019/0352171 A1 Nov. 21, 2019

(51) Int. Cl.
*B67D 7/32* (2010.01)
*B60K 15/04* (2006.01)
*B67D 7/42* (2010.01)
*B60K 15/03* (2006.01)

(52) U.S. Cl.
CPC ............ *B67D 7/3281* (2013.01); *B60K 15/04* (2013.01); *B67D 7/42* (2013.01); *B60K 2015/0323* (2013.01); *B60K 2015/049* (2013.01); *B60K 2015/0461* (2013.01)

(58) Field of Classification Search
CPC ........ B67D 7/3281; B67D 7/42; B60K 15/04; B60K 2015/0323; B60K 2015/0461; B20K 2015/049
USPC .......................................... 141/350; 220/86.2
See application file for complete search history.

(56) References Cited

U.S. PATENT DOCUMENTS

| | | | | |
|---|---|---|---|---|
| 2,179,808 A | * | 11/1939 | Berg | A47L 9/19 116/202 |
| 2,247,509 A | * | 7/1941 | Lebus | B60K 15/04 220/86.2 |
| 3,520,332 A | * | 7/1970 | Willard | F16K 31/043 137/624.13 |
| 3,642,036 A | * | 2/1972 | Ginsburgh | B25J 5/06 141/94 |
| 4,342,383 A | * | 8/1982 | Burnett | B65G 69/181 138/46 |
| 5,609,190 A | * | 3/1997 | Anderson | B67D 7/0401 138/112 |

(Continued)

FOREIGN PATENT DOCUMENTS

EP 1354731 A1 * 10/2003 ............ B60G 17/025

*Primary Examiner* — Timothy L Maust
*Assistant Examiner* — James R Hakomaki (57) ABSTRACT

A capless fuel system comprises a fuel inlet body, a flapper pivotably mounted within the fuel inlet body, a biasing member associated with the flapper, an axially movable shaft associated with the biasing member, and a tension calibrator associated with the biasing member, whereby tension on the controller spring may be adjusted by the calibrator. The biasing member may be of a variety of biasing elements but is preferably a controller spring. The shaft is reversibly movable from a tensioning position in which the electromechanical driver assembly is deactivated to a tension-lowering position in which the electromechanical driver assembly is activated. The capless fuel system includes a fuel pump nozzle position sensing system. The capless fuel system relies upon a single, multi-function flapper that functions as both the capless fuel system debris cover and a sealing member to prevent evaporative emission leaks.

20 Claims, 9 Drawing Sheets

(56) References Cited

U.S. PATENT DOCUMENTS

| | | | | | |
|---|---|---|---|---|---|
| 5,732,840 | A * | 3/1998 | Foltz | ............... | B60K 15/04 141/325 |
| 6,003,568 | A * | 12/1999 | Strnad, Jr. | ............... | B60K 15/04 123/519 |
| 6,253,802 | B1 * | 7/2001 | Enge | ............... | B60K 15/03519 123/518 |
| 6,474,376 | B2 * | 11/2002 | Hagano | ............... | B60K 15/04 141/312 |
| 6,476,732 | B1 | 11/2002 | Stephan | | |
| 7,182,109 | B2 * | 2/2007 | Kolberg | ............... | B60K 15/04 137/592 |
| 8,186,394 | B2 * | 5/2012 | Nourdine | ............... | B60K 15/04 141/348 |
| 8,627,860 | B2 | 1/2014 | Ferguson et al. | | |
| 8,651,151 | B2 * | 2/2014 | Berghorst | ............... | B60K 15/04 141/348 |
| 8,979,808 | B1 * | 3/2015 | Chong | ............... | A61M 5/484 604/246 |
| 9,393,864 | B2 * | 7/2016 | Yamamoto | ............... | B60K 15/04 |
| 9,835,516 | B2 | 12/2017 | Thakkar et al. | | |
| 10,024,470 | B2 * | 7/2018 | Aso | ............... | B60K 15/04 |
| 10,207,913 | B2 * | 2/2019 | Kim | ............... | B67D 7/3245 |
| 2009/0079225 | A1 * | 3/2009 | Katou | ............... | E05B 77/48 296/97.22 |
| 2013/0206256 | A1 * | 8/2013 | Trudel | ............... | F16K 15/033 137/527 |
| 2014/0083531 | A1 * | 3/2014 | Maskell | ............... | F16K 15/025 137/527 |
| 2014/0367390 | A1 * | 12/2014 | Horlacher | ............... | B60K 15/04 220/562 |
| 2015/0120151 | A1 | 4/2015 | Akay et al. | | |
| 2016/0069492 | A1 * | 3/2016 | Aso | ............... | B60K 15/04 251/68 |
| 2017/0217307 | A1 * | 8/2017 | Dennis | ............... | B60K 15/04 |
| 2018/0135342 | A1 * | 5/2018 | Pearce | ............... | E05D 11/10 |

* cited by examiner

FUEL CAPLESS UNIT HAVING VARIABLE SPRING STIFFNESS

TECHNICAL FIELD

The disclosed inventive concept relates generally to fuel inlets for automotive vehicles. More particularly, the disclosed inventive concept relates to capless fuel systems for use with automotive vehicles which senses the presence of a service station fuel pump to modify the level of resistance needed for insertion of the fuel nozzle. The disclosed inventive concept further applies higher a biasing force against the fuel flappers once fueling has been completed.

BACKGROUND OF THE INVENTION

For many decades following the introduction of the automobile, the conventional fuel cap was of the threaded or bayonet lock type which, eventually, was covered by a pivotable fuel inlet cover integrally formed with the design of the vehicle body. More recently, and in order to improve the user experience, the fuel cap has been replaced in many applications with a capless fuel inlet having a spring-loaded flapper arrangement to close the inlet once fueling has been completed. Like the traditional fuel cap, the capless fuel inlet is covered by a pivotable fuel inlet cover that is also integrally formed with the design of the vehicle body.

The spring-loaded flapper arrangement of a typical capless fuel inlet includes two pivotable covers or flappers. One of these covers is the outer cover that is seen by the user during refueling once the pivotable fuel inlet cover is opened. The other cover is the inner cover pushed upon by the tip of the fuel nozzle after insertion of the nozzle into the fuel inlet. Each cover or flapper has its own defined functionality and role in the capless fuel inlet. However, movement of each of the covers is regulated by a mechanical spring.

While producing generally satisfactory results, the typical capless fuel inlet may be improved. A limitation of known capless fuel inlet arrangements is related to the countered design requirements. It is understood that the springs must demonstrate sufficient stiffness so as to secure the covers tightly enough between fueling so as to prevent evaporative emissions (EVAP) leaks. However, it is also understood that the springs must demonstrate sufficient softness so as to prevent the user from having to apply an unreasonable amount of force when inserting the nozzle for fueling. The relative ease of insertion is particularly an issue when the operator is physically compromised.

In addition, the matter of the level of ease related to nozzle insertion is particularly pronounced in situation of non-integrated refueling canister only system (NIRCOS) sealed fuel tanks. This is because the capless units on the NIRCOS require a stronger spring to withstand the relatively large vacuum excursions experienced during overnight diurnal cooling. Accordingly, the effort needed by the user to insert the nozzle into the capless fuel inlet associated with the NIRCOS fuel tank during refueling is greater than with capless fuel inlets associated with conventional fuel tanks.

As in so many areas of vehicle technology there is always room for improvements related to the design of a capless fuel inlet so as to improve the user experience. Particularly, it would be advantageous to provide a capless fuel inlet in which the biasing forces applied against one or both of the flapper covers may be selectively softened for ease of operator use while being firm enough to provide the force necessary to prevent EVAP leaks. It would be furthermore advantageous to provide such a system that requires little or no maintenance over its anticipated operating life, is highly durable, and that embodies both relatively low production and assembly costs.

SUMMARY OF THE INVENTION

The disclosed inventive concept overcomes the problems of capless fuel systems by providing a system that incorporates a single flapper having a biasing member that may have its tension calibrated so as to be fine-tuned to meet the preferences of an individual operator. The disclosed inventive concept further provides a system that senses the position of a fuel nozzle relative to the capless fuel system to move between a position of increased, seal-forming tension when no fuel nozzle is sensed and a position of reduced tension to allow for easier displacement of the flapper, thereby enabling a user having lowered physical ability to refuel the vehicle.

The capless fuel system of the disclosed inventive concept comprises a fuel inlet body, a flapper pivotably mounted within the fuel inlet body, a biasing member associated with the flapper, an axially movable shaft associated with the biasing member, and a tension calibrator associated with the biasing member, whereby tension on the controller spring may be adjusted by the calibrator. The biasing member may be of a variety of biasing elements but is preferably though not exclusively a controller spring.

The axially movable shaft is reversibly movable from a tensioning position in which the electromechanical driver assembly is deactivated to a tension-lowering position in which the electromechanical driver assembly is activated.

The capless fuel system of the disclosed inventive concept includes a fuel pump nozzle position sensing system. A variety of sensors maybe used but is preferably though not exclusively a camera. If a fuel pump nozzle is sensed to be in a position in close proximity to the fuel pump nozzle position sensing system, tension on the biasing member is reduced by movement of the axially movable shaft away from the biasing member.

The capless fuel system of the disclosed inventive concept advantageously relies upon a single, multi-function flapper that functions as both the capless fuel system debris cover and a sealing member to prevent evaporative emission leaks. By eliminating the second flapper that is conventionally used in today's capless fuel system, the disclosed inventive concept increases ease of operation while decreasing manufacturing assembly and maintenance costs.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

In the following figures, the same reference numerals will be used to refer to the same components. In the following description, various operating parameters and components are described for different constructed embodiments. These specific parameters and components are included as examples and are not meant to be limiting.

In general, variations of a fluid level indicating system according to the disclosed inventive concept are illustrated in the figures. With the exception of FIG. 1 which illustrates a capless fuel arrangement according to known technology, the figures illustrate a preferred but non-limiting embodiment of the capless fuel system. It is to be understood that the embodiment of the capless fuel system disclosed herein is illustrative and is not intended as being limiting. For example, the configuration of the controller spring may be other than as shown and may include two or more separate springs and electromechanical driver assembly. Furthermore, the controller spring and electromechanical driver assembly could incorporate a drive gear, such as a helical gear, a threaded gear, or a worm gear.

Regardless of the embodiment, the capless fuel system of the disclosed inventive concept provides a cost-effective and highly tunable arrangement for securely sealing the fuel inlet of a motor vehicle. The capless fuel system of the disclosed inventive concept may be adapted for use with any fuel system of any type of vehicle.

Figure 1:
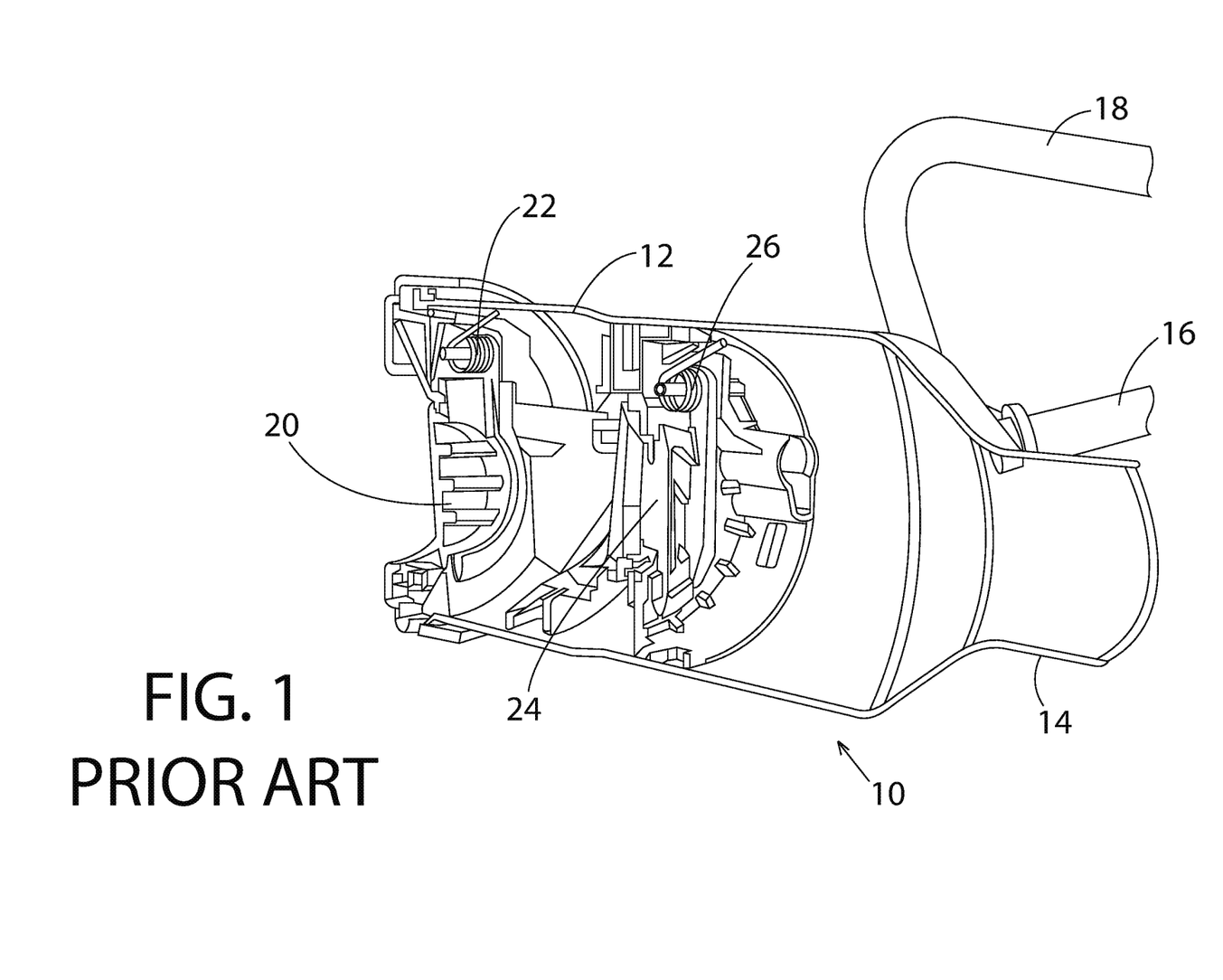
FIG. 1 is a perspective sectional view of a capless fuel system according to known technology.

An example of a capless fuel system according to known technology is illustrated in perspective sectional view in FIG. 1. The capless fuel system of the prior art, generally illustrated as 10, conventionally includes a fuel inlet body 12 having a narrowed fuel neck 14. The narrowed fuel neck 14 is fluidly connected with the vehicle's fuel tank (not shown). A fuel overflow line 16 and an emission line 18 are also conventionally provided.

As is known in the art, the capless fuel system 10 includes two movable covers. This includes an outer cover 20 having a mechanical controller spring 22 and an inner cover 24 having a mechanical controller spring 26. As illustrated, the mechanical controller springs 22 and 26 are provided in in two different locations. The mechanical controller spring 22 has a functionality that is separate from that of the mechanical controller spring 26. Unlike the disclosed inventive concept, the capless fuel system 10 according to known technology requires two separate controller springs 22 and 26 and two separate covers 20 and 24, an arrangement that is relatively expensive to manufacture and maintain and which does not provide the robust tunability of the disclosed inventive concept.

Figure 10:
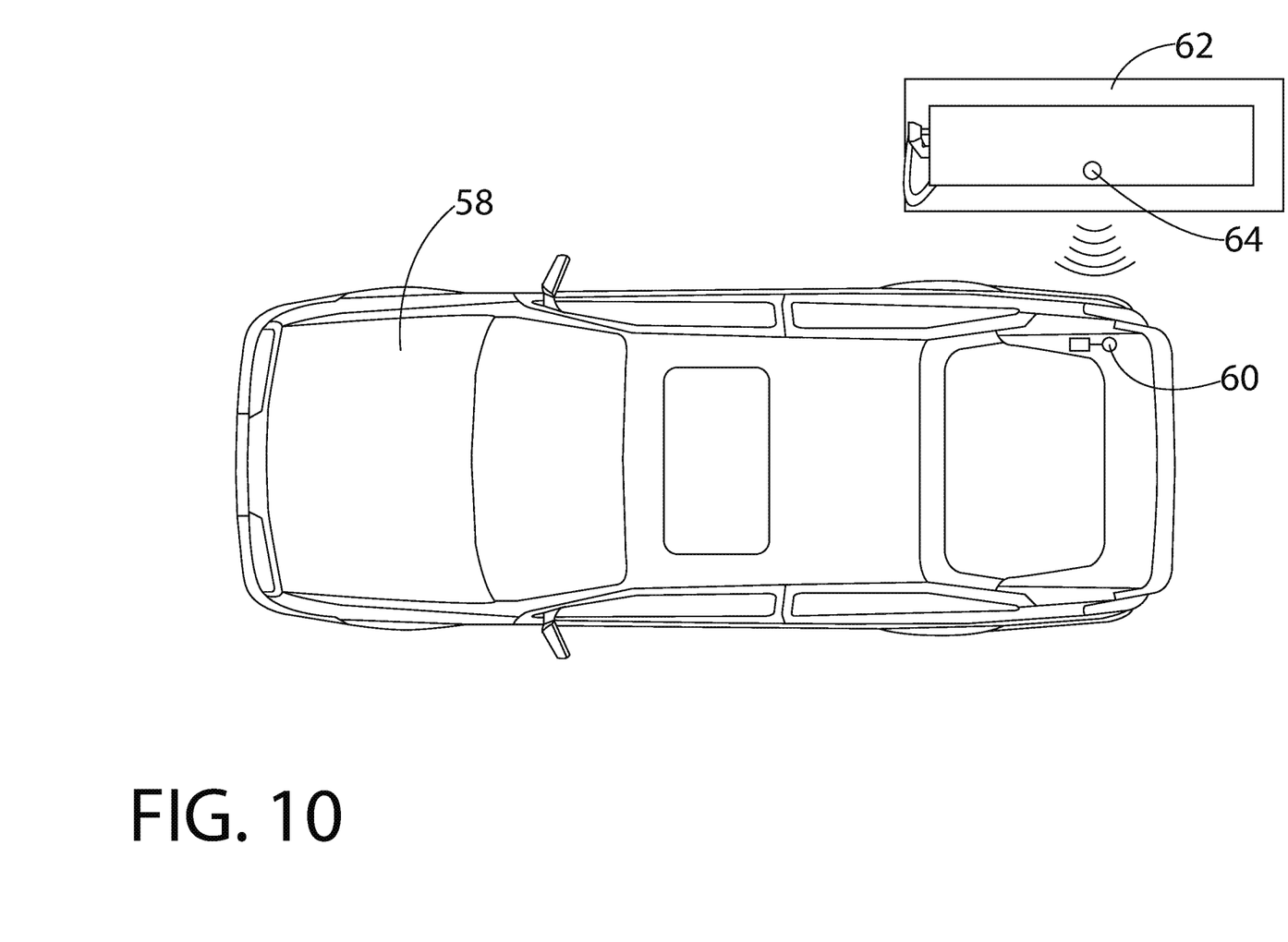
FIG. 10 is a top view of a stylized vehicle in relation to a fuel pump.
Figure 11:
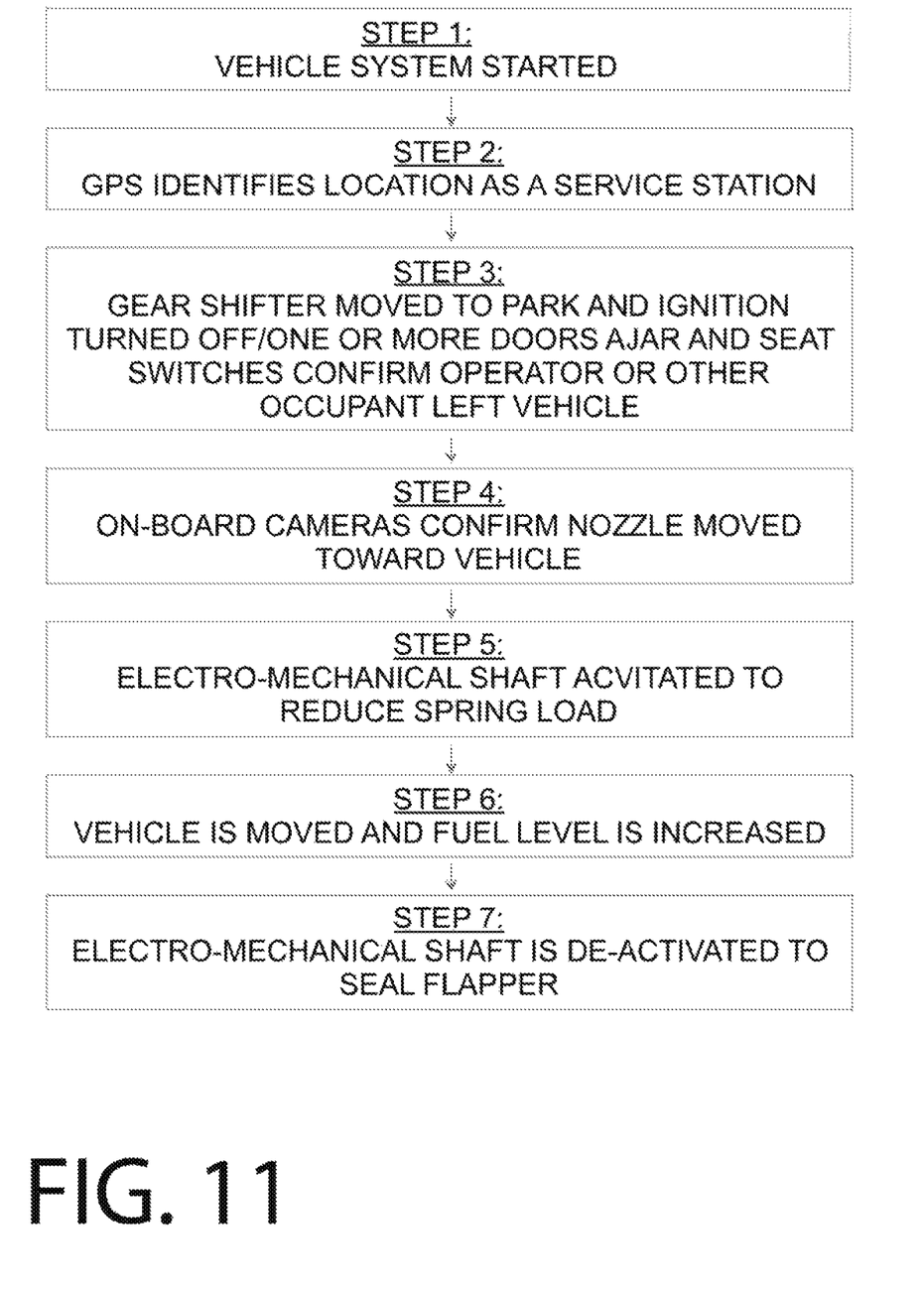
FIG. 11 is a flow chart illustrating the operational steps of the disclosed inventive concept.

Referring to FIGS. 2 through 9, the capless fuel system according to the disclosed inventive concept is illustrated in various views. A variation of the capless fuel system of the disclosed inventive concept is illustrated in FIG. 10 which provides a sensor arrangement between the vehicle and a fuel pump to signal the removal of tension from the controller spring. A flow chart is shown in FIG. 11 which illustrates the steps involved in responding to the proximity of the fuel pump of FIG. 10.

Figure 2:
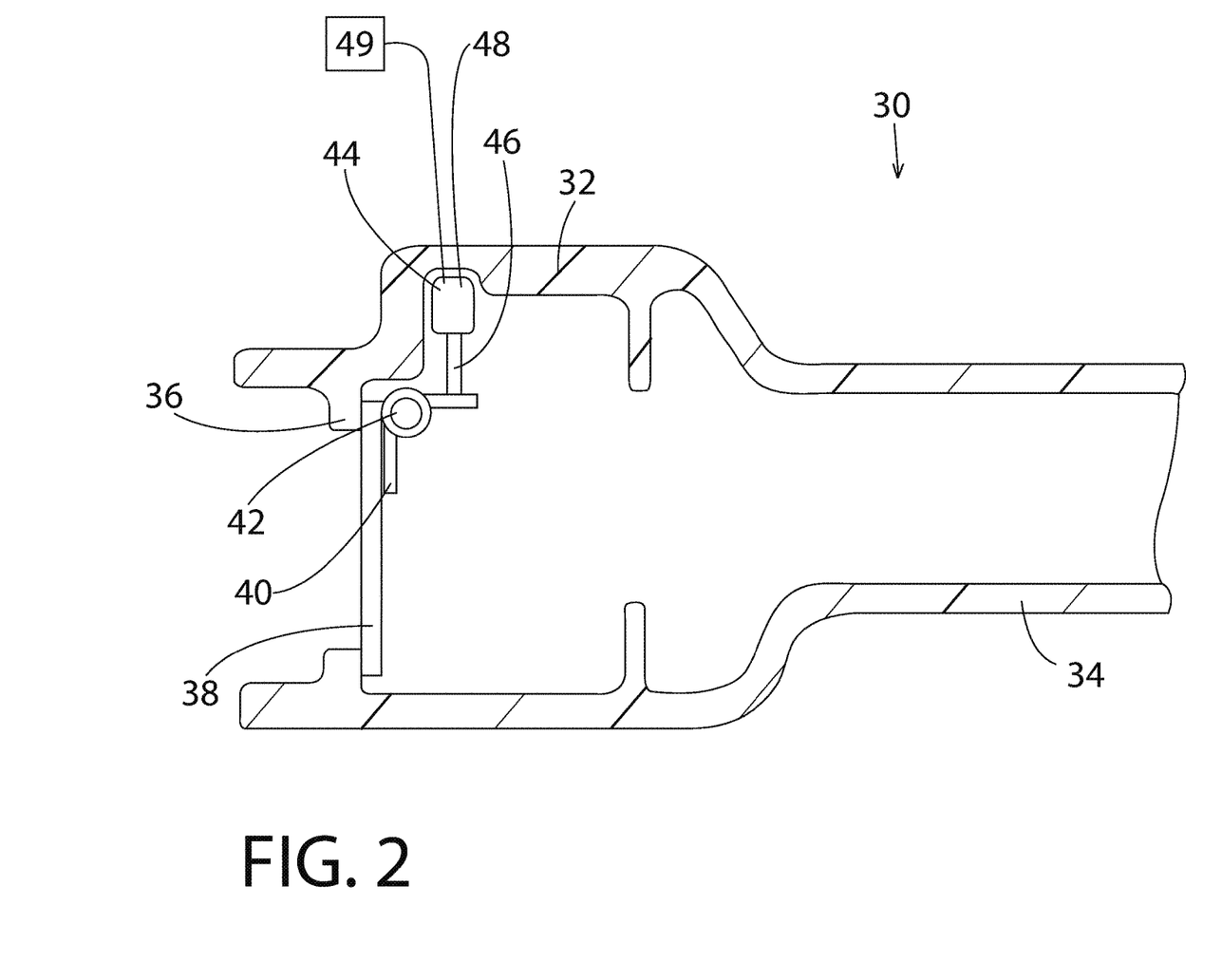
FIG. 2 is a sectional view of a capless fuel system according to the disclosed inventive concept.

Referring to FIG. 2, a sectional view of the preferred embodiment of the capless fuel system of the disclosed inventive concept is illustrated. The capless fuel system, generally illustrated as 30, includes a fuel inlet body 32 having a narrowed fuel tank neck 34. The narrowed fuel tank neck 34 is fluidly connected to a fuel tank (not shown). The shape and size of the fuel inlet body 32 and the associated narrowed fuel tank neck 34 may be varied from those illustrated in FIG. 2 while still keeping within the spirit and scope of the disclosed inventive concept.

A radial sealing flange 36 is preferably formed at the mouth of the fuel inlet body 32. A fuel flapper 38 is positionable against the radial sealing flange 36 between fuel pumping to prevent the escape of liquids and gases from the capless fuel system 30. The fuel flapper 38 also prevents foreign material from entering the capless fuel system 30. The fuel flapper 38 as illustrated is only suggestive as fuel flappers of other designs and sizes may be suitable.

To maintain a tight seal between the fuel flapper 38 and the radial sealing flange 36 between fueling operations, a biasing member is provided. As illustrated, the biasing member is a torsion spring 40. A spring support shaft 42 retains the torsion spring 40 in position and allows for pivoting movement of the torsion spring 40.

An adjustable electromechanical driver assembly 44 is fitted between the fuel inlet body 32 and the torsion spring 40. The adjustable electromechanical driver assembly 44 includes an axially movable spring tensioning shaft 46 that is movably fitted to a tensioning shaft driver housing 48. It is to be understood that while the adjustable electromechanical driver assembly 44 preferably includes an axially movable tensioning shaft 46 and a tensioning shaft driver housing 48, other biasing element tensioning arrangements are possible such as a gear-driven shaft.

The tension on the controller spring 40 may be calibrated as needed depending on the application. Accordingly, a tension calibration controller 49 is provided. The tension calibration controller 49 is provided to calibrate the tension on the controller spring 40. This is necessary so that the flapper 38 may be readily moved in the case of, for example, a more senior operator or for an operator with physical limitations. Accordingly, the same vehicle may be used by a broad variety of customers with the calibration of the tension on the flapper 38 being adjusted using the tension calibration controller 49 according to the preference and physical abilities of a given operator. While adding a high degree of tunability to the vehicle's fuel system, the disclosed inventive concept eliminates the need for more than one fuel inlet flapper, thus reducing both manufacturing cost and replacement cost. The tension calibration controller 49 may be set at the factory depending on the preferences of the specific operator or may be set by the operator as part of the "preferences" such as seat and mirror adjustment settings. For example, "operator 1" may prefer a relatively low resistance for the flapper 38 to allow for easy insertion of the fuel nozzle into the fuel inlet body 32 while "operator 2" may prefer a higher resistance.

Figure 3:
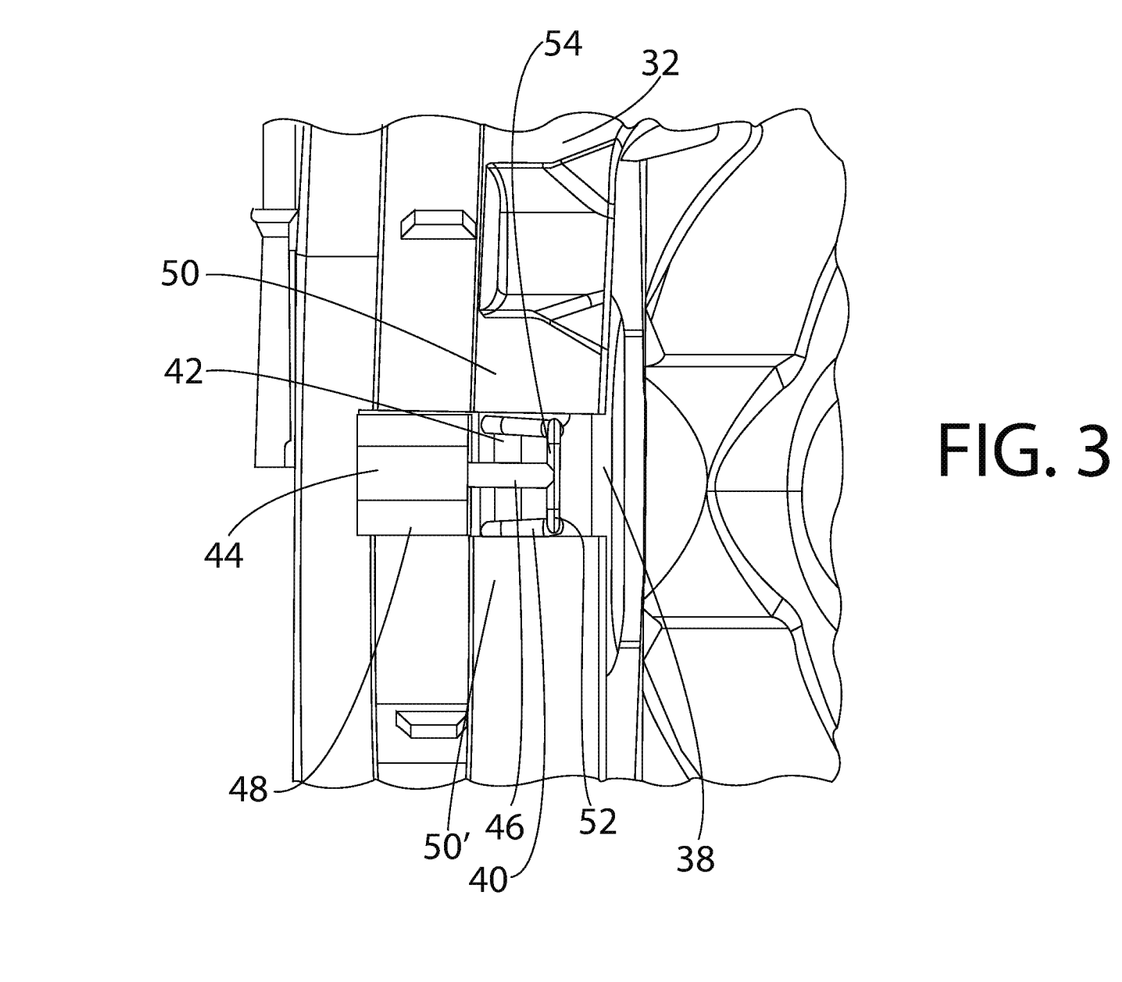
FIG. 3 is a top environmental view of the electromechanical system in place relative to a flapper door and a fuel inlet.
Figure 4:
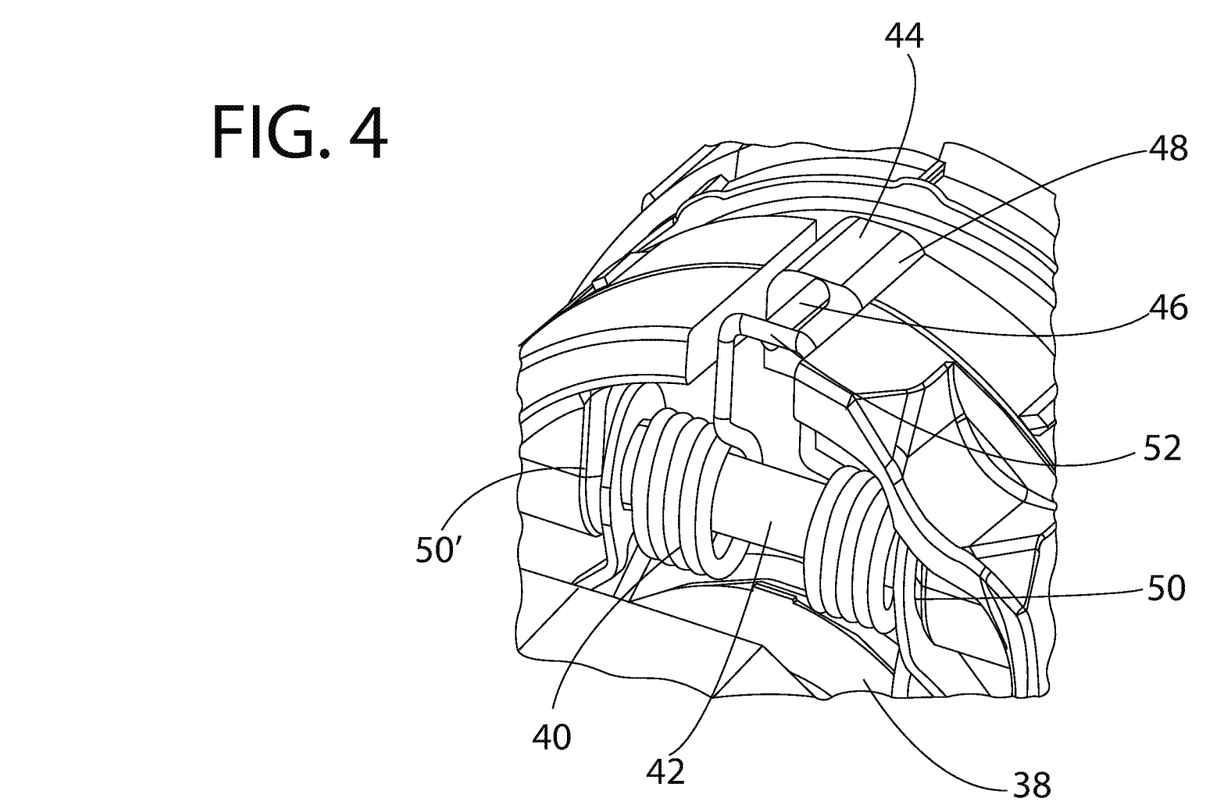
FIG. 4 is a perspective view of the environmental view of the electromechanical system shown in FIG. 3.
Figures 5, 7:
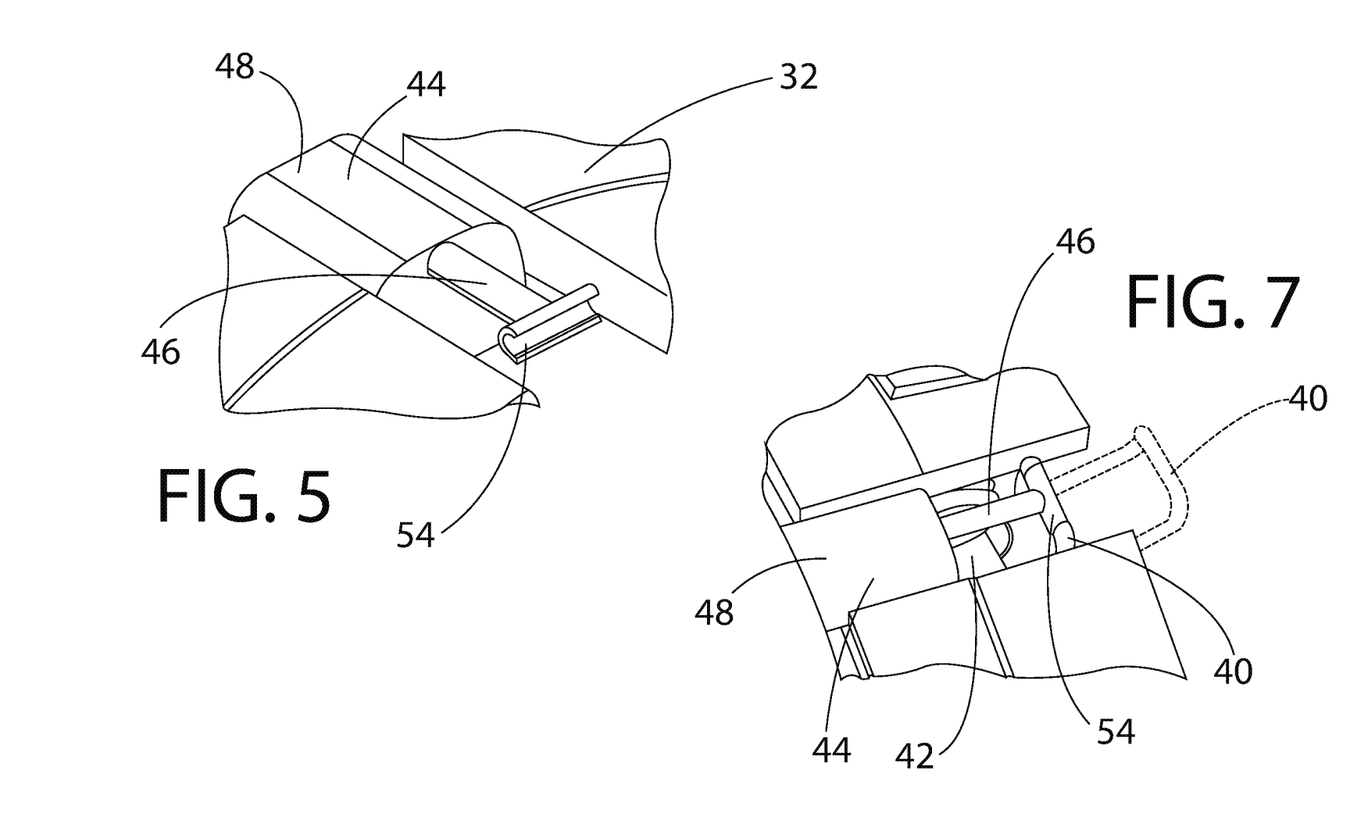
FIG. 5 is a perspective view of the electromechanical shaft, spring interface, and spring for use in the electromechanical system of the disclosed inventive concept.
FIG. 7 is another perspective view of the electromechanical shaft assembly and spring interface for use in the electromechanical system of the disclosed inventive concept.
Figure 6:
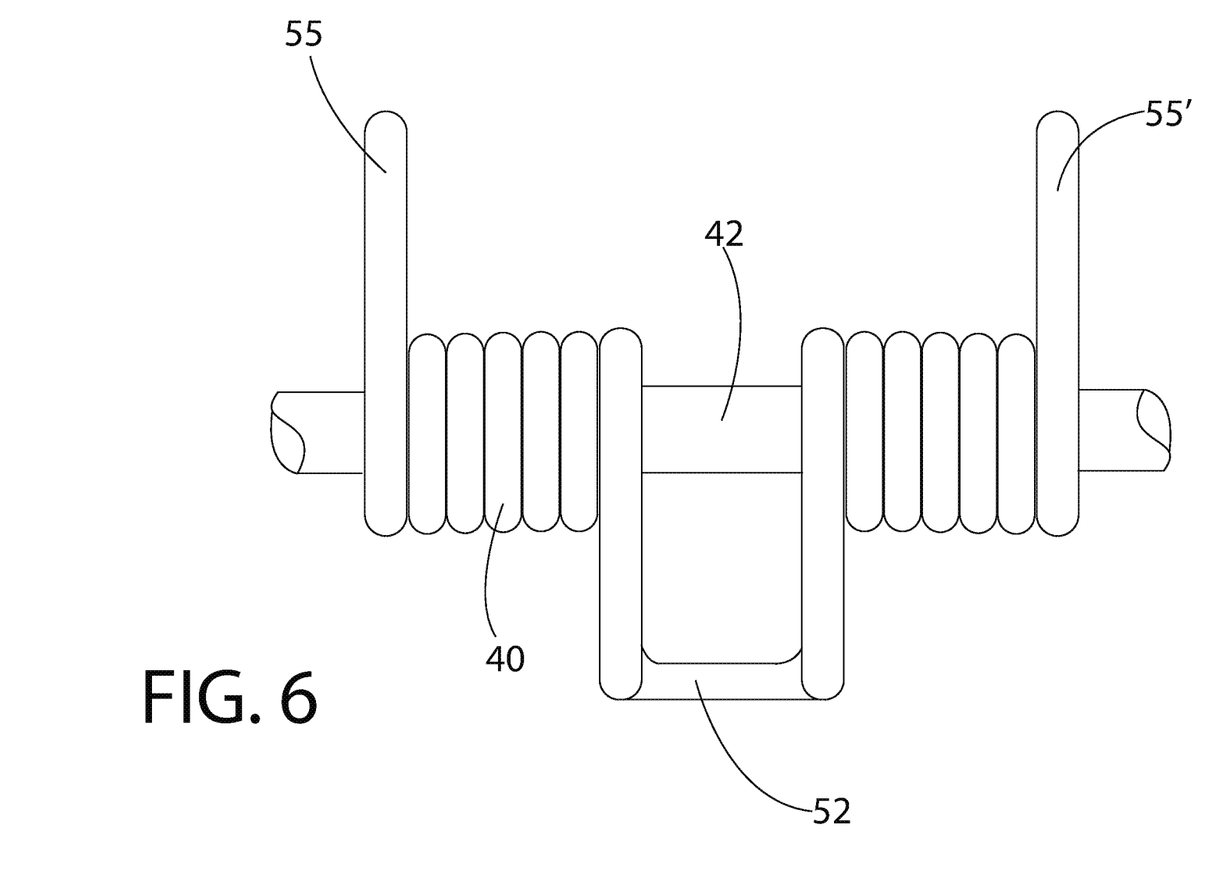
FIG. 6 is a top view of the spring on a spring shaft for use in the electromechanical system of the disclosed inventive concept.

Referring to FIGS. 3 and 4, top and perspective views of the electromechanical driver assembly 44 in position as part of the capless fuel system 30 of the disclosed inventive concept are illustrated. These figures illustrate a support arrangement for the controller spring 40 that includes a pair of spaced apart lateral shaft support housings 50 and 50' that support the spring support shaft 42. In addition, FIGS. 3 and 4 illustrate a controller spring shaft interface portion 52 centrally formed as part formed as part of the controller spring 40. Mated with the controller spring shaft interface portion 52 is an interface portion support channel 54 that is formed at the distal end of the axially movable spring tensioning shaft 46. The interface portion support channel 54 is illustrated without the adjacent controller spring 40 in FIG. 5. The controller spring 40 is shown in isolation in relation to the spring support shaft 42 in FIG. 6. As shown in FIG. 6, the controller spring 40 includes, in addition to the controller spring shaft interface portion 52, a pair of spaced-apart lateral flapper spring attachment arms 55 and 55' that interface with the flapper 38 and apply pressure thereupon.

Because the controller spring 40 is continuously under load to one degree or another, the interface portion support channel 54 is always in contact with the controller spring shaft interface portion 52. When more spring tension is required to apply added pressure to the flapper 38 so that it is fully seated against the radial sealing flange 36 (as would be the case between fueling operations), the axially movable tensioning shaft 46 is extended from the tensioning shaft driver housing 48 thereby increasing tension of the controller spring 40. Movement of the controller spring 40 from its relaxed or minimum tension position to its maximum tension position as driven by the axially movable tensioning shaft 46 of the adjustable electromechanical driver assembly 44 is illustrated in FIG. 7. With reference to this figure, the controller spring 40 is shown in solid lines in its relaxed or minimum tension position and in broken lines in its maximum tension position. Tension is selectively applied by calibrated operation of the adjustable electromechanical driver assembly 44.

Figure 8:
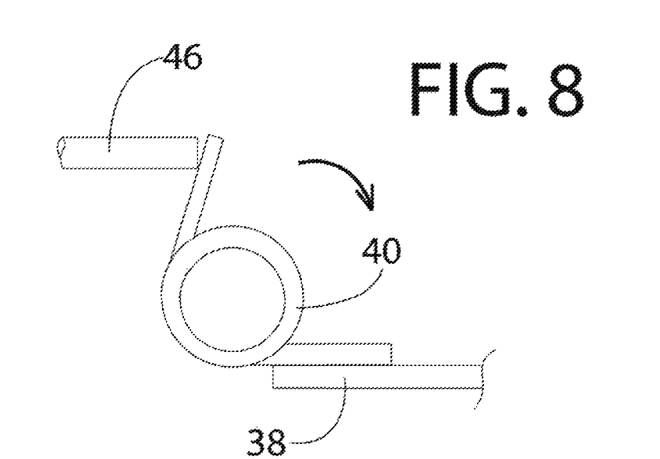
FIG. 8 is a stylized side view of the spring in its normal, non-fueling position between the electromechanical shaft and the flapper.
Figure 9:
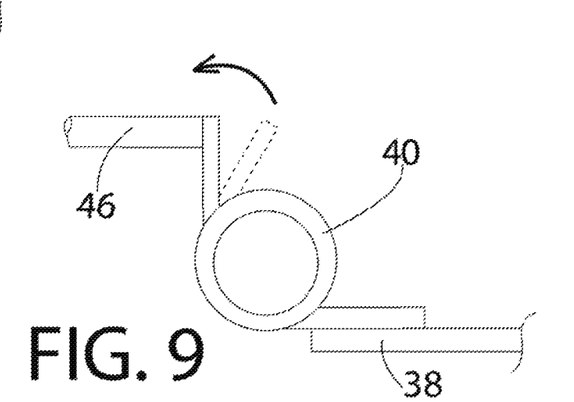
FIG. 9 is a stylized side view of the spring of FIG. 8 illustrated in its fueling position in which the load has been removed from the spring, thereby allowing relatively easy movement of the flapper for fueling.

The difference between the controller spring 40 being in its state of maximum tension and being in its state of minimum tension is illustrated in FIGS. 8 and 9. These figures illustrate the controller spring 40 in its installed, pre-loaded state positioned between the flapper 38 and the axially movable tensioning shaft 46 of the adjustable electromechanical driver assembly 44.

With reference to FIG. 8, a stylized side view of the controller spring 40 in its normal, non-fueling position is illustrated. This is the deactivated default setup representing the condition of the controller spring 40 in normal driving conditions. In this situation, the axially movable tensioning shaft 46 is locked forward and the spring arm angle of the controller spring 40 is in its high tension position.

For pre-fueling and subsequent fueling, the axially movable tensioning shaft 46 is activated and is moved linearly rearward into the tensioning shaft driver housing 48 thereby relieving tension on the controller spring 40. This change in position is illustrated in FIG. 9. The travel distance of the axially movable tensioning shaft 46 is preferably though not absolutely equal to δ mm which allows the controller spring 40 to shift to a new position of reduced tension. In the new position, the arm angle of the controller spring 40 is α=135−Θ/2 and the tension on the controller spring 40 is reduced to a level that is satisfactory to the user.

The axially movable tensioning shaft 46 may be moved to the fueling position illustrated in FIG. 9 either manually by the vehicle operator or automatically when the vehicle is positioned adjacent a fuel pump. The latter circumstance is illustrated in FIG. 10 in which a top view of a stylized vehicle 58 having a fuel pump nozzle position sensor such as a camera 60 is shown in position relative to fuel pump 62 having a GPS signal emitter 64. (The GPS signal emitter 64 may be fitted anywhere on or adjacent to the fuel pump 62.)

When the vehicle 58 arrives at the fuel pump 62, the operator parks the vehicle 58, and shuts off the vehicle's ignition. The camera 60 confirms that the fuel pump nozzle is being moved toward the capless fuel system 30 of the disclosed inventive concept. Upon confirmation that the fuel pump nozzle is moving toward the capless fuel system 30, the axially movable tensioning shaft 46 is moved from its forward position shown in FIG. 8 in which tension is applied to the flapper 38 to its rearward position shown in FIG. 9 in which tension on the flapper 38 is lowered to a level that satisfies the vehicle operator. Once fueling is completed and the fuel pump nozzle is moved away from the capless fuel system 30, the axially movable tensioning shaft 46 is deactivated and is extended to its normal driving condition illustrated in FIG. 8, thus applying sufficient tension on the flapper 38 to prevent evaporative emissions (EVAP) leaks.

FIG. 11 provides a flow chart that summarizes the operational steps of the disclosed inventive concept incorporating the fuel pump nozzle sensing arrangement of FIG. 10. At Step 1, the vehicle system is initiated. Subsequently, at Step 2, the location of a service station is identified by a GPS array. The vehicle operator moves the gear shifter of the vehicle to PARK and the ignition is turned to its OFF position while at the same time on-board sensors sense that a door is ajar while seat switches confirm a vehicle operator has left the vehicle at Step 3. This allows for the situation where a vehicle occupant other than the vehicle operator undertakes refueling.

With confirmation that an occupant left the vehicle at Step 3, the on-board camera 60 confirms movement of the fuel nozzle toward the capless fuel system 30 at Step 4. Once the on-board camera confirms fuel nozzle movement in the direction of the capless fuel system 30, the axially movable tensioning shaft 46 is activated and moves to relieve tension from the controller spring 40 at Step 5. Thereafter, once fueling is completed and an increase of the fuel level is sensed at Step 6, the axially movable tensioning shaft 46 is deactivated and the load on the controller spring 40 is increased to provide the appropriate seal at Step 7.

The capless fuel system of the disclosed inventive concept may find applications beyond the automobile environment and may be applied in any system in which an operator refuels a vehicle. This includes not only automotive vehicles, but buses, trucks, and agricultural equipment of a wide variety.

One skilled in the art will readily recognize from the above discussion, and from the accompanying drawings and claims, that various changes, modifications and variations can be made therein without departing from the true spirit and fair scope of the invention as defined by the following claims.

What is claimed is:

1. A capless fuel system for a vehicle comprising:
a fuel inlet body;

a flapper pivotably mounted within said fuel inlet body;
a biasing member associated with said flapper, said biasing member having an end;
an axially movable shaft having an end that presses directly against said end of said biasing member; and
a tension calibrator associated with said biasing member, whereby tension by said end of said shaft against said end of said biasing member may be adjusted by said calibrator.

2. The capless fuel system of claim 1, wherein said biasing member is a controller spring.

3. The capless fuel system of claim 1, wherein said flapper is a single, multi-function flapper that functions as both a capless fuel system cover and a sealing member to prevent evaporative emissions leaks.

4. The capless fuel system of claim 1, further including a fuel pump nozzle position sensing system.

5. The capless fuel system of claim 4, wherein said fuel pump nozzle position sensing system includes a camera.

6. The capless fuel system of claim 1, further including an electromechanical driver assembly, said axially movable shaft being movably associated with said electromechanical driver assembly.

7. The capless fuel system of claim 6, further including an interface portion support channel associated with said axially movable shaft to interface with said biasing member.

8. The capless fuel system of claim 6, wherein said axially movable shaft is reversibly movable from a tensioning position in which said electromechanical driver assembly is deactivated to a tension-lowering position in which said electromechanical driver assembly is activated.

9. A vehicle capless fuel system for use with a fuel pump having a fuel pump nozzle, the system comprising:
a fuel inlet body;
a flapper pivotably mounted within said fuel inlet body;
a biasing member associated with said flapper, said biasing member having an end;
an axially movable shaft having an end that presses against said end of said biasing member and applies tension directly thereto; and
a nozzle position sensing system, whereby said sensing system senses the presence of the fuel pump nozzle and adjusts said tension applied by said axially movable shaft against said end of said biasing member in response thereto
a tension calibrator associated with said biasing member, whereby tension by said end of said shaft against said end of said biasing member may be adjusted by said calibrator.

10. The vehicle capless fuel system of claim 9, wherein said fuel pump nozzle position sensing system includes a camera.

11. The vehicle capless fuel system of claim 9 further including a tension calibrator associated with said biasing member, whereby tension on said biasing member may be adjusted by said calibrator.

12. The vehicle capless fuel system of claim 9, wherein said biasing member is a controller spring.

13. The vehicle capless fuel system of claim 9, wherein said flapper is a single, multi-function flapper that functions as both a capless fuel system cover and a sealing member to prevent evaporative emissions leaks.

14. The vehicle capless fuel system of claim 9, further including an electromechanical driver assembly, said axially movable shaft being movably associated with said electromechanical driver assembly.

15. The vehicle capless fuel system of claim 14, further including an interface portion support channel associated with said axially movable shaft to interface with said biasing member.

16. The vehicle capless fuel system of claim 14, wherein said axially movable shaft is reversibly movable from a tensioning position in which said electromechanical driver assembly is deactivated to a tension-lowering position in which said electromechanical driver assembly is activated.

17. A method for regulating the tension applied by a biasing member on a vehicle capless fuel system flapper for use with a fuel pump having a fuel pump nozzle, the method comprising:
forming a vehicle capless fuel system having a fuel inlet body, a flapper pivotably mounted within said fuel inlet body, a biasing member associated with said flapper, said biasing member having an end, an axially movable shaft having an end that presses directly against said end of said biasing member, a tension calibrator associated with said biasing member, whereby tension by said end of said shaft directly against said end of said biasing member may be adjusted by said calibrator, and a nozzle position sensing system;
moving the fuel pump nozzle toward said vehicle capless fuel system;
causing the axially movable shaft to move axially in response to the presence of the fuel pump nozzle, said axial movement of said axially movable shaft being to relieve tension on said biasing member.

18. The method for regulating tension applied by a biasing member of claim 17, wherein said fuel pump nozzle position sensing system includes a camera.

19. The method for regulating tension applied by a biasing member of claim 17, further including a tension calibrator associated with said biasing member for adjusting tension on said biasing member.

20. The method for regulating tension applied by a biasing member of claim 17, wherein said flapper is a single, multi-function flapper that functions as both a capless fuel system cover and a sealing member to prevent evaporative emissions leaks.

* * * * *